(12) United States Patent
Hei et al.

(10) Patent No.: US 8,714,582 B2
(45) Date of Patent: May 6, 2014

(54) RIDE ALONG BOARD FOR BABY STROLLER

(75) Inventors: Joseph S. Hei, Palo Alto, CA (US);
Bryan T. White, Fremont, CA (US);
Colter P. Leys, Menlo Park, CA (US);
Simon M. S. Weiss, Menlo Park, CA (US)

(73) Assignee: Orbit Baby, Inc., Newark, CA (US)

( * ) Notice: Subject to any disclaimer, the term of this patent is extended or adjusted under 35 U.S.C. 154(b) by 514 days.

(21) Appl. No.: 12/569,785

(22) Filed: Sep. 29, 2009

(65) Prior Publication Data
US 2010/0109270 A1  May 6, 2010

Related U.S. Application Data

(60) Provisional application No. 61/101,084, filed on Sep. 29, 2008.

(51) Int. Cl.
*B62B 7/14* (2006.01)

(52) U.S. Cl.
USPC ........................... 280/656; 280/47.35

(58) Field of Classification Search
USPC ............... 280/32.7, 204, 647, 650, 642, 656, 280/304.1, 63, 79.11, 47.38
See application file for complete search history.

(56) References Cited

U.S. PATENT DOCUMENTS

| | | | |
|---|---|---|---|
| 2,382,989 A * | 8/1945 | Gilbert | 280/87.041 |
| 2,612,388 A * | 9/1952 | McNeill et al. | 280/295 |
| 3,000,645 A * | 9/1961 | Schmidt | 280/39 |
| 3,485,314 A * | 12/1969 | Herr | 180/19.1 |
| 3,734,536 A * | 5/1973 | Dever et al. | 280/204 |
| 3,834,726 A * | 9/1974 | Hobza | 280/87.041 |
| 4,190,280 A * | 2/1980 | Donohoe | 296/20 |
| 6,302,421 B1 * | 10/2001 | Lee | 280/210 |
| 6,371,498 B2 | 4/2002 | Lundh | |
| 6,422,634 B2 | 7/2002 | Lundh | |
| 6,443,252 B1 * | 9/2002 | Andes | 180/65.1 |
| 6,540,238 B2 | 4/2003 | Yang | |
| 6,637,760 B1 | 10/2003 | Carman | |
| 6,698,772 B1 | 3/2004 | Cervantes | |
| 6,827,356 B2 | 12/2004 | Zhuang | |
| 7,004,272 B1 | 2/2006 | Brown et al. | |

(Continued)

FOREIGN PATENT DOCUMENTS

DE  297 19 064 U1 * 12/1997 ............... B62B 9/28

*Primary Examiner* — J. Allen Shriver, II
*Assistant Examiner* — Bridget Avery
(74) *Attorney, Agent, or Firm* — Morrison & Foerster LLP (57) ABSTRACT

A baby stroller system is provided including a baby stroller and a ride along board attached thereto for supporting a rider (e.g., a child) while the stroller is pushed. The ride along board may include a platform for the rider to stand upon and at least one wheel for supporting the platform. Additionally, the ride along board is positioned asymmetrically relative to the stroller, e.g., in-line with one of the rear wheel or laterally outside of the stroller wheel base. Further, the platform may be positioned laterally outside of the handlebars, thereby providing more room for the rider (e.g., not having to stand or squeeze between the handlebars) and moving the ride along board and rider away from the moving space of a user pushing the stroller. The ride along board further includes at least three wheels defining a ride along board wheel base, where a center of mass of the ride along board is within the wheel base. The ride along board may be attached to opposing ends of an axle of one of the rear wheels.

23 Claims, 13 Drawing Sheets

(56) References Cited

U.S. PATENT DOCUMENTS

| | | |
|---|---|---|
| 7,338,122 B2 | 3/2008 | Hei et al. |
| 7,364,183 B2 | 4/2008 | Lee |
| 8,006,786 B1 * | 8/2011 | Chapman ............ 180/65.1 |
| 8,220,823 B2 * | 7/2012 | Queen ............... 280/650 |
| 2001/0033069 A1 | 10/2001 | Ivers |
| 2002/0171212 A1 * | 11/2002 | Bricko ............... 280/32.7 |
| 2003/0025304 A1 * | 2/2003 | Haeggberg ........... 280/656 |
| 2006/0290081 A1 * | 12/2006 | Baum ................ 280/32.7 |
| 2007/0045972 A1 * | 3/2007 | Thompson ............ 280/47.4 |
| 2007/0114738 A1 | 5/2007 | Jones et al. |
| 2008/0001370 A1 * | 1/2008 | Cousin .............. 280/32.7 |

\* cited by examiner

RIDE ALONG BOARD FOR BABY STROLLER

CROSS-REFERENCE TO RELATED
APPLICATIONS

This application claims priority from U.S. Provisional Application No. 61/101,084, filed Sep. 29, 2009. The provisional application is hereby incorporated by reference in its entirety for all purposes.

BACKGROUND

Field

The present invention relates generally to baby strollers, and in one particular example, to a ride along board system including a platform that travels on the ground alongside a baby stroller.

BRIEF SUMMARY

According to one aspect of the present invention, a baby stroller system is provided comprising a baby stroller and a ride along board attached thereto for supporting a rider (e.g., a child) while the stroller is pushed. The ride along board may include a platform for the rider to stand upon and at least one wheel for supporting the platform. Additionally, the ride along board is positioned asymmetrically relative to the stroller, e.g., in-line or symmetric with one of the rear wheels or laterally outside of the stroller wheel base (e.g., outside of the width of the rear wheels). Further, the platform may be positioned laterally outside of the handlebars, thereby providing more room for the rider (e.g., not having to stand or squeeze between the handlebars), and moving the ride along board and rider away from the moving space of a user pushing the stroller.

In one example, the ride along board further includes at least three wheels defining a ride along board wheel base (e.g., the two-dimensional area of the wheels supporting the stroller), where a center of mass of the ride along board is within the wheel base. Further, the ride along board may be attached to opposing ends of an axle of one of the rear wheels. In other examples, the ride along board is attached to a portion of the baby stroller frame.

In another aspect of the invention a ride along board is provided, the ride along board including a platform for a rider to stand on, at least one wheel mounted to the platform, and an interface for engaging opposing ends of a wheel axle (e.g., a rear wheel of a baby stroller). The interface may include holes for receiving opposing ends of the wheel axle, pins for engaging opposing ends of the wheel axle, a clamp for engaging a stroller frame, or the like. In one example, the ride along board includes at least three wheels defining a ride along board wheel base, where a center of mass of the ride along board is within the wheel base.

The asymmetrical mounting of the ride along board system to a stroller may allow for taller riders relative to conventional symmetrical mounting systems. For example, mounting outside of the handlebars such that riders are not forced to stand or squeeze there between. Further, the asymmetrical mounting of the ride along board moves the board and wheels away from the feet of the user pushing the stroller (as can be a problem with other, center-mounted systems). Additionally, in one example, the rider stands in a side-ways stance relative to the forward stroller motion which may increase forward/aft stability during use.

In one example, the platform of the ride along board is supported primarily by three or more wheels, where the center of mass of the platform is within the wheel base. Such an arrangement may avoid (or at least reduce relative to prior art symmetrical mounting systems) loading of the stroller's wheels and/or suspension by addition of the ride along board and rider thereon. Further, the ride along board may be attached to the stroller in various manners. In one example, the ride along board attaches at the axle of one of the rear wheels, e.g., attaching at opposing ends of the wheel axle or sharing a common axle with the wheel. In other examples, the ride along board may attach or clamp to a frame member of the stroller. In some examples, a baby stroller may accommodate multiple boards and thus multiple riders. Further, the ride along board may support a variety of attachment configurations with a stroller and thus riding positions for a rider. In some examples, the platform of the ride along board provides a skateboard-like riding style, which may provide for greater stability of the rider.

In some examples, the stroller is further equipped with handles for the rider to engage (e.g., hold) during use. The handles may include a clip-on rigid handle, harness/tether for the rider to lean against, a subway/bus stile strap or grip, padded handlebar covers with handles, or the like.

When not in use, the ride along board may be detached from the stroller, and in one example, stored under the stroller's seating surface. In one example, the underside of the seating surface is equipped with an engagement mechanism, such as a rail, for receiving and securing the ride along board when not in use. In another example, the ride along board may fold or rotate with respect to the stroller, off the ground, when not in use. Further, with the ride along board in the storage position the stroller may still be collapsible to a folded position with the ride along board attached thereto.

DETAILED DESCRIPTION

The following description sets forth numerous specific configurations, parameters, and the like. It should be recognized, however, that such description is not intended as a limitation on the scope of the present invention, but is instead provided as a description of exemplary embodiments. Various modifications to the examples described will be readily apparent to those of ordinary skill in the art, and the general principles defined may be applied to other examples and applications without departing from the spirit and scope of the invention. Thus, the present invention is not intended to be limited to the examples described herein and shown, but is to be accorded a scope consistent with the claims.

Various baby strollers may be used with or include exemplary ride along board systems described. An exemplary stroller is described and shown in U.S. Pat. No. 7,338,122, entitled "Modular Child Restraint System," which issued on Mar. 4, 2008, and is hereby incorporated by reference in its entirety. Of course, it will be recognized that the exemplary ride along board systems may be used with various other baby strollers, including, but not limited to basinet strollers, jogger strollers, and the like.

Figure 1A:
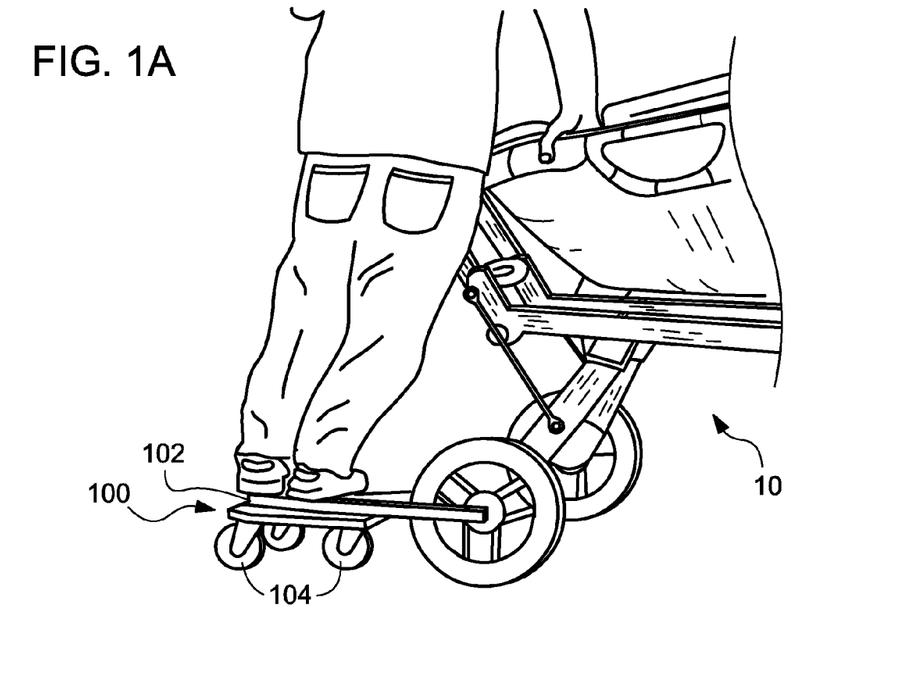
FIGS. 1A and 1B illustrate a baby stroller with an exemplary ride along board system that mounts asymmetrically to the baby stroller.
Figure 1B:
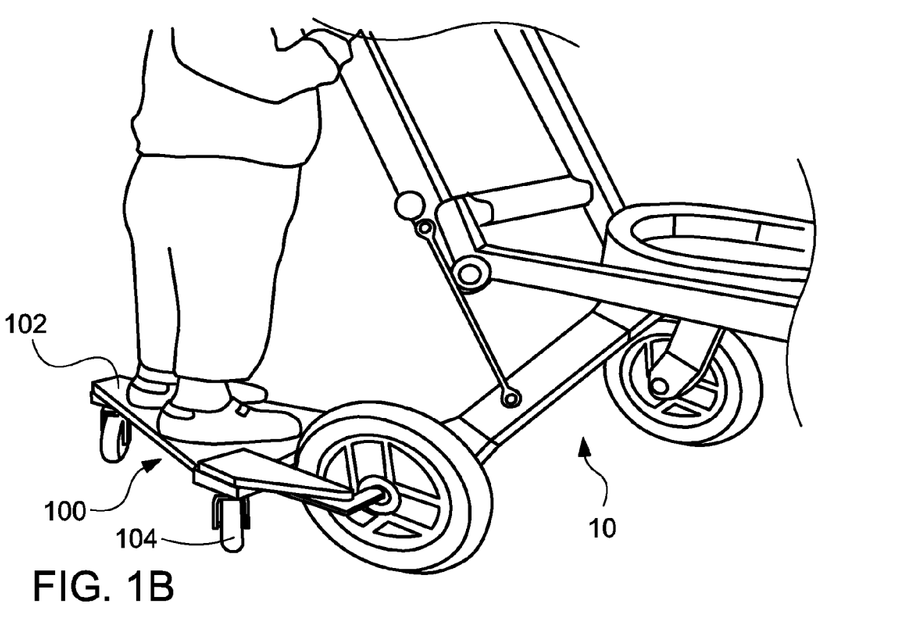

FIGS. 1A and 1B illustrate a baby stroller 10 with an exemplary ride along board system 100 that mounts asymmetrically to the baby stroller 10. In this example, the ride along board system 100 includes a platform 102 for a rider, e.g., a small child, to stand on. Further, the ride along board system 100 includes three or more wheels 104 mounted to the platform 102, which may reduce stress on the stroller suspension or frame as compared to a board with one or two wheels distally located relative to the attachment point with the stroller. In this example, the ride along board further includes an interface for attaching the platform to the stroller; in this example, a U-shaped interface for engaging opposing ends of the rear wheel axle.

In this example, the ride along board system 100 is mounted in-line with a rear wheel of the stroller 10, e.g., the ride along board is aligned or symmetric with the plane of the rear wheel. A ride along board system that mounts asymmetrically to the baby stroller may enable a more stable riding position for the rider. For instance, as shown in FIGS. 1A and 1B (and FIG. 6 discussed below), a rider may hold on to a handle or handhold for greater stability. An asymmetrically mounted system also positions the platform 102 outside the handlebars to give the rider more moving space (e.g., the rider is not constrained by the stroller frame or handlebars). An asymmetrically mounted system also positions the ride along board system 100 outside of the handlebars such that the ride along board system 100 is not in the way of the feet of the person pushing the stroller. By contrast, a symmetric or center mounted system (e.g., where a ride along board is centered between the rear wheels) may be positioned in the way of a natural walking motion when pushing the stroller.

Figure 2:
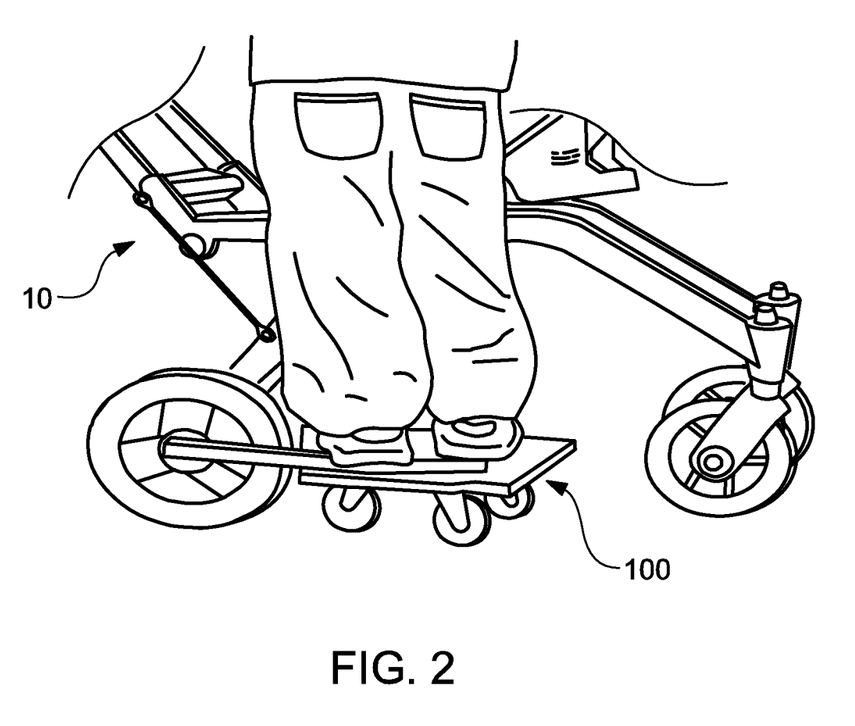
FIG. 2 illustrates an exemplary ride along board system with the platform positioned in front of a rear wheel of a baby stroller.

As shown in FIG. 2 the exemplary ride along board system 100 can be attached to the stroller 10 in various configurations allowing the rider to ride in a variety of riding positions. In this particular example, the ride along board system 100 is positioned in front of the rear wheel of the baby stroller 10, between the rear wheel and front wheel. Such a configuration may provide more room for the rider and/or the pusher, as well as position the ride along board and rider closer to the center of mass of the baby stroller 10.

Figure 3A:
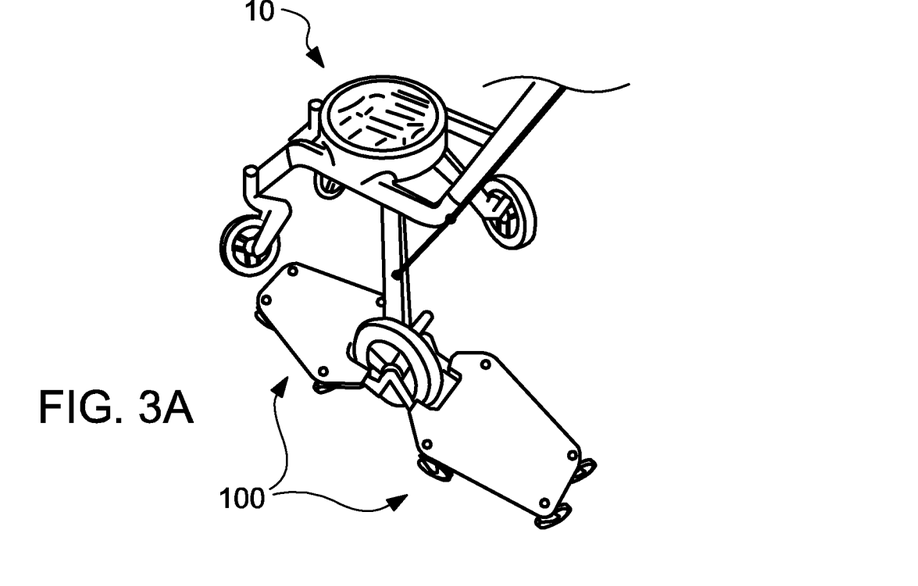
FIGS. 3A and 3B illustrate exemplary configurations of ride along board systems asymmetrically mounted to a baby stroller.
Figure 3B:
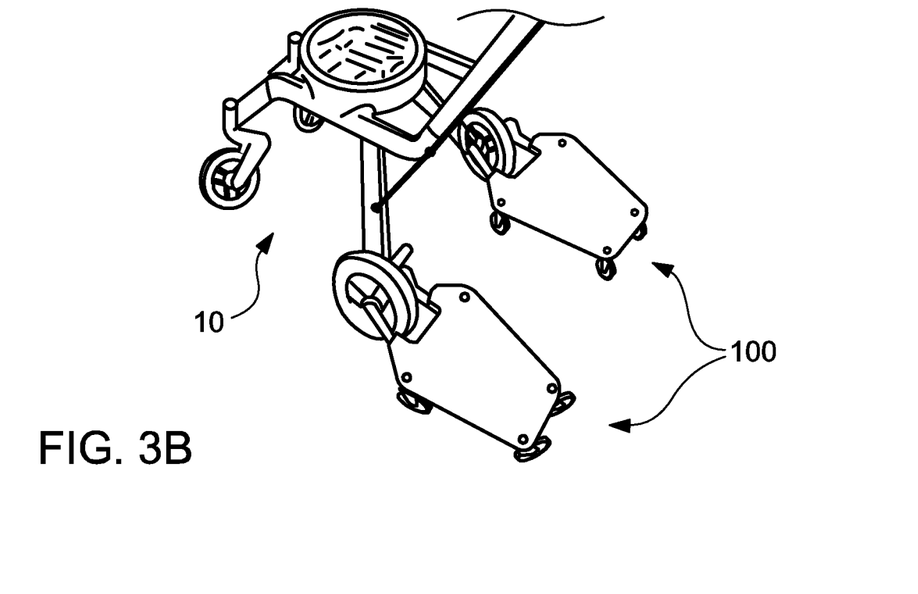

As shown in FIGS. 3A and 3B, multiple ride along board systems 100, 101 can be attached to a baby stroller 10 in various configurations, and thus support multiple riders. For instance, as seen in FIG. 3A, a ride along board 100 may be positioned in front of the rear wheel, between the front and rear wheel (see, e.g., FIG. 2) and ride along board 101 behind the rear wheel. Additionally, multiple ride along boards may be positioned and supported by a single wheel of the stroller. Further, as seen in FIG. 3B, ride along boards 100, 101 may be attached with multiple wheels of the stroller, in this instance, both rear wheels thereof. It will be appreciated further that other arrangements not shown are possible to include three or four ride along boards with a single stroller.

Figure 4:
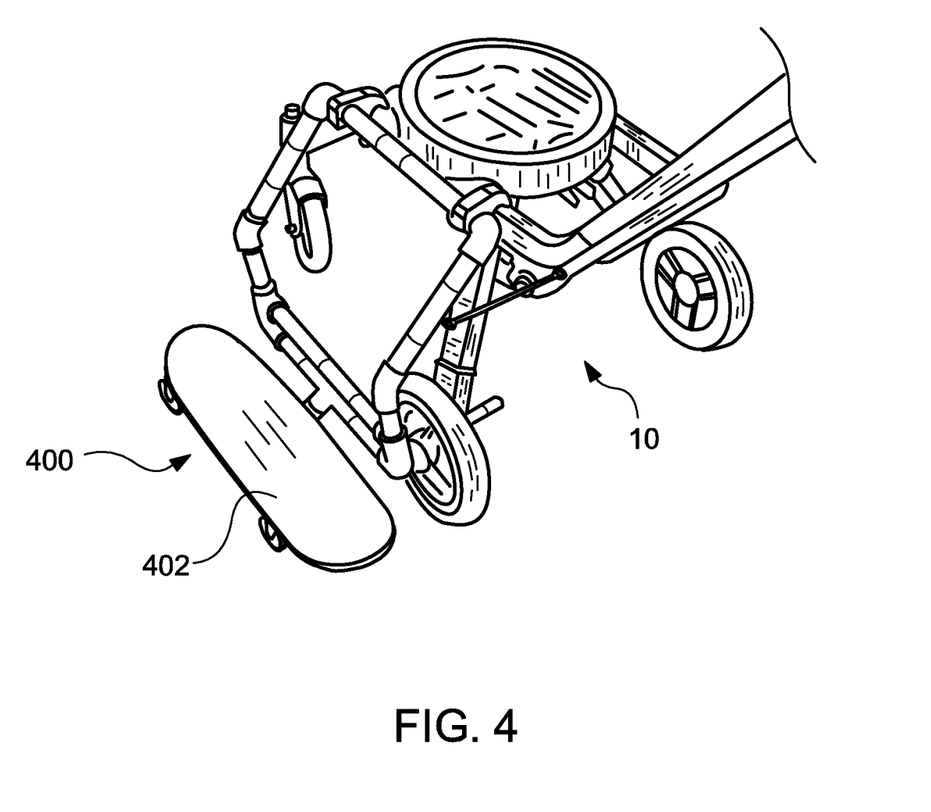
FIG. 4 illustrates an exemplary ride along board system asymmetrically mounted to a baby stroller with the platform positioned both outside one of the wheels and the handlebars of a baby stroller.

FIG. 4 illustrates yet another exemplary ride along board system 400 asymmetrically mounted to a baby stroller 10 with the platform 402 positioned both outside one of the wheels and the handlebars of a baby stroller 10. In this example, the platform 402 is supported by four wheels such that the center of mass of the platform is within the wheel base. Such a configuration may be mounted to the stroller via the stroller frame, a wheel axle as described, or a combination thereof.

Figure 5A:
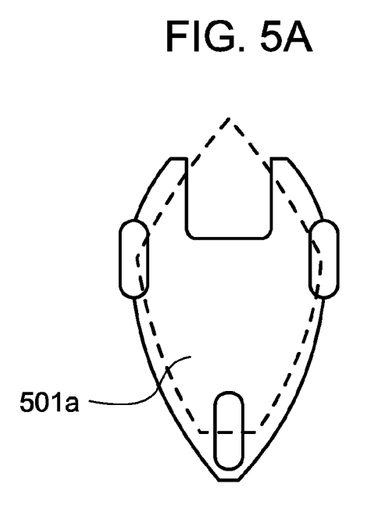
FIGS. 5A-5C illustrate exemplary ride along board systems with three or more wheels.
Figure 5B:
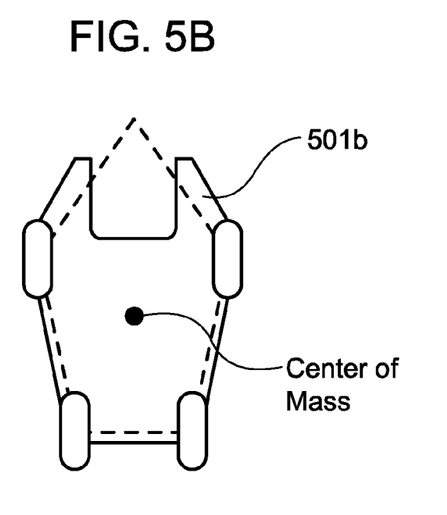
Figure 5C:
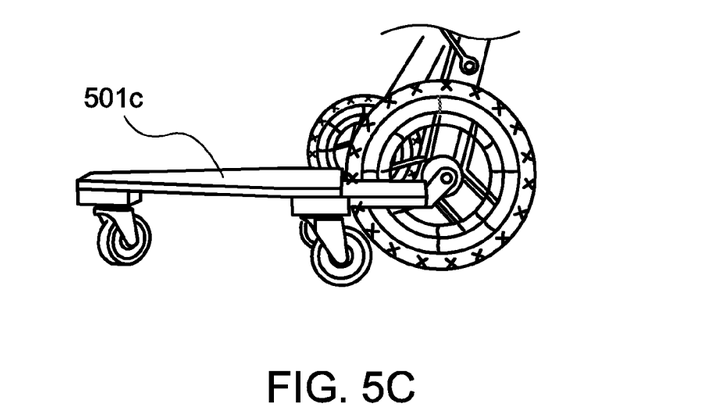

FIGS. 5A-5C illustrate exemplary ride along board systems 500$a$-$c$ with three or more wheels for stability independent of the stroller's support. The wheels may be made of polyurethane with diameter between 40 to 100 mm. In one example (such as FIG. 5B), the wheels are positioned such that a center of mass of the platform 502$b$ (and a rider standing thereon) is within the wheel base and supported primarily or wholly by the ride along board wheels. Such an arrangement reduces forces on the stroller's suspension or wheels, whether attached to the frame or wheel axle, compared, e.g., to a board that includes wheel(s) positioned distally from the attachment to the stroller.

Figure 6:
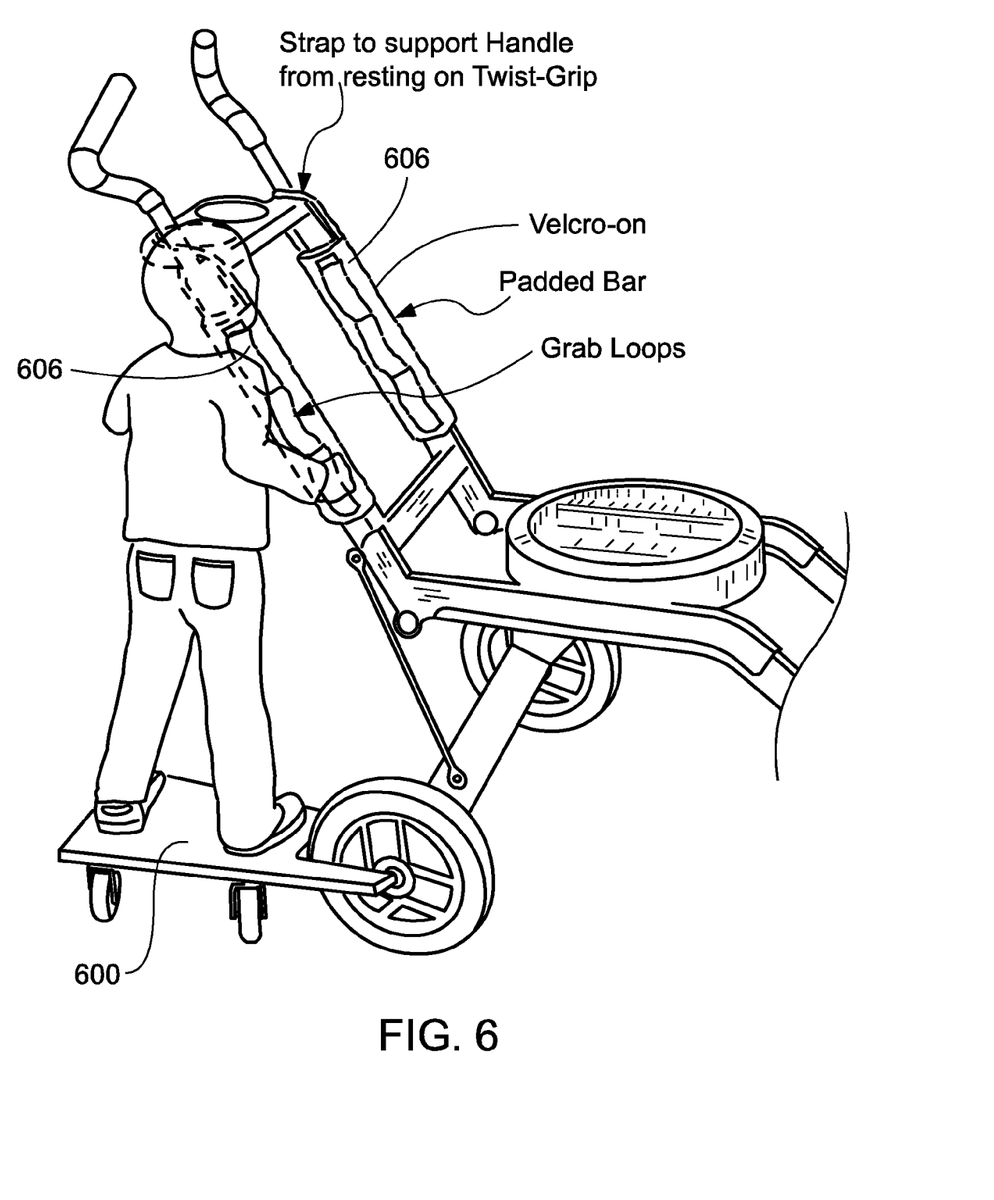
FIG. 6 illustrates an exemplary ride along board system with padded handlebars and handholds for a rider to hold onto for stability and/or safety.

FIG. 6 illustrates an exemplary ride along board system with handholds 606 for a rider to hold onto for stability. In this example, the handlebars are further padded to protect the rider from bumping against the handlebars. The handholds and/or padding can be attached via Velcro or otherwise removably attached to the frame of the stroller. Various other handles and arrangements are contemplated. Other handholds include, but are not limited to the following: clip-on rigid handle, handle that mounts between the handlebar tubes, harness for the rider to clip to and lean against, and subway-style strap.

Figure 7A:
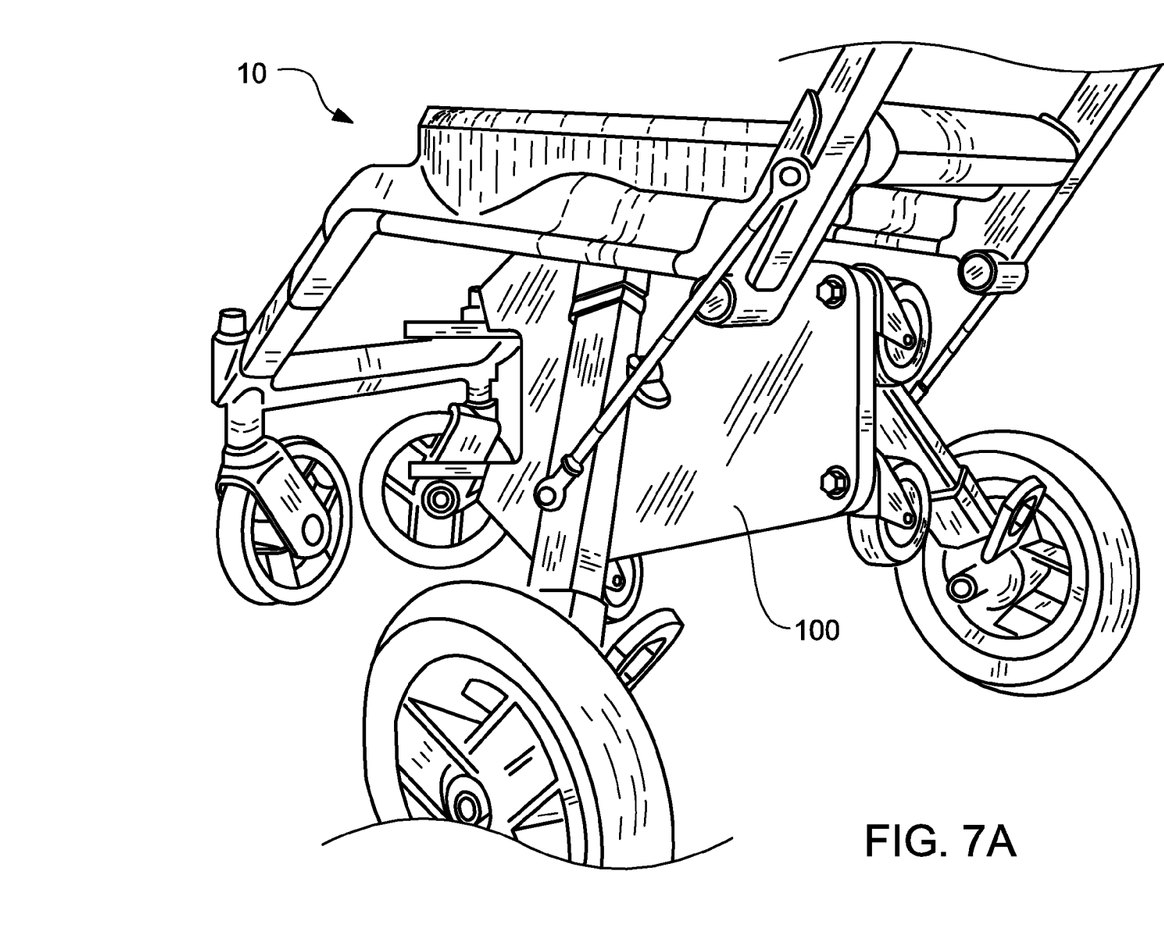
FIGS. 7A-7C illustrates exemplary ride along board systems for storing the platform when not in use.

FIG. 7A illustrates an exemplary ride along board system 100 stored with the stroller 10 when not in use. For instance, when not in use the ride along board may be removed in various fashions as described herein and stored below or to the side of the stroller seating surface. In one example, an engagement feature is included underneath the seating surface for receiving and securing the ride along board. The engagement feature may include a rail which receives an edge of the ride along board. In other examples, the engagement feature may include a clip or pin, shelf, or the like for securing ride along board when not in use.

Figure 7B:
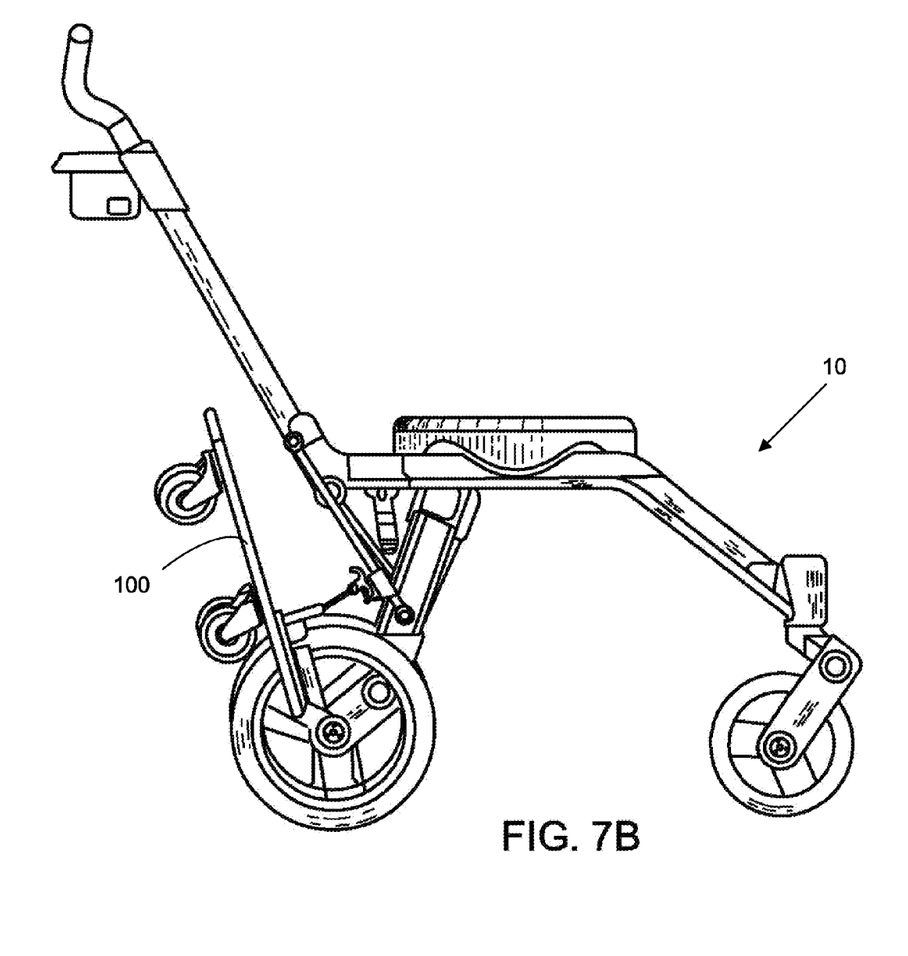
Figure 7C:
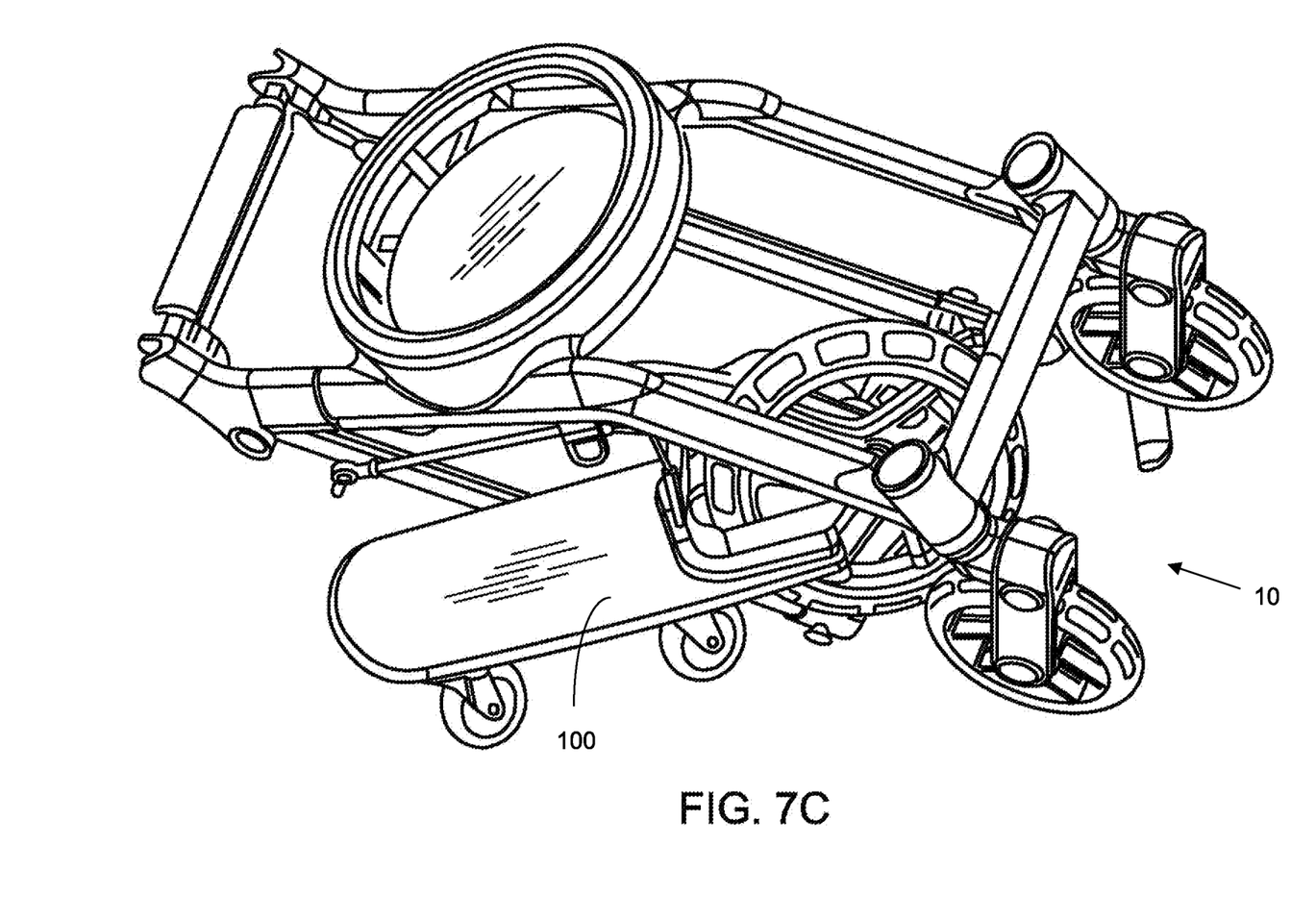

In another example, the ride along board system 100 can fold or rotate off of the ground when not in use (but stay attached to the stroller 10) as illustrated in FIGS. 7B and 7C. In this example, a cable is used to secure or hold the ride along board system 100 in a position off the ground. Of course, other means for maintaining the ride along board system 100 in such a position are possible, e.g., a latch, button, magnetic coupling, Velcro fastener, or the like. Because the ride along board 100 is connected asymmetrically, for example, in-line with a rear wheel or outside of the wheel base width, the ride along board will stay out of the way of the person pushing the stroller when rotated or folded up. In comparison, a symmetric or centered ride along board may remain in the walking space of the person pushing the stroller if folded up. Further, in some examples, stroller 10 is still collapsible or foldable with the ride along board system 100 attached thereto, as illustrated in FIG. 7C.

Figure 8A:
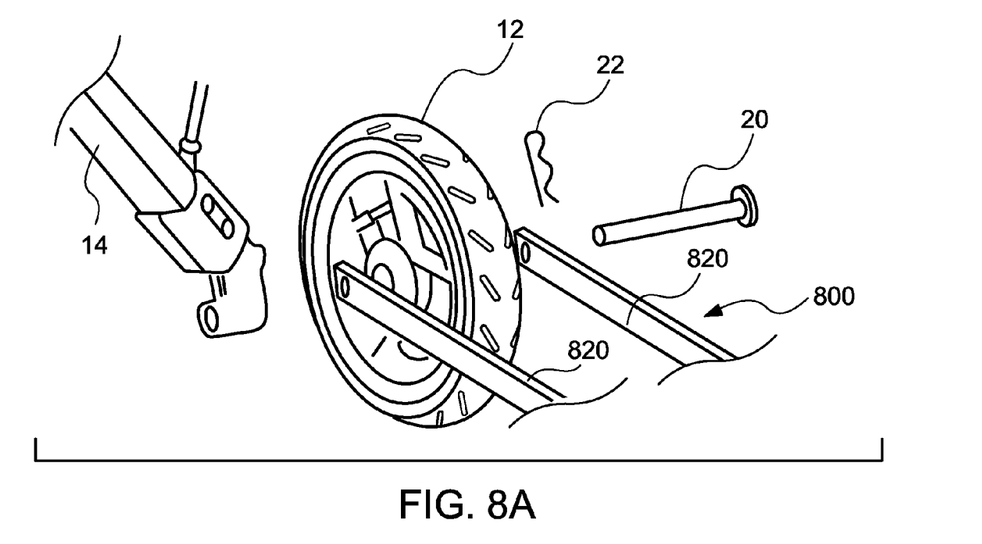
FIG. 8A illustrates an exemplary ride along board system in which the interfaces attach to the left and right ends of the axle of a stroller wheel.
Figure 8B:
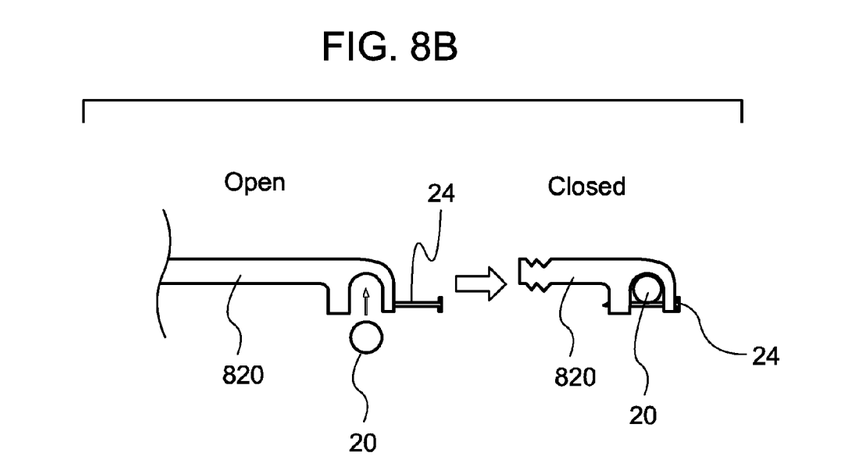
FIG. 8B illustrates an exemplary ride along board system in which the interface attaches the platform to the stroller at the rear wheel axle when a pin is inserted through two openings on the interface.

FIG. 8A illustrates an exemplary ride along board system 800 in which the interface 820 attaches to opposing ends of an axle 20 of a stroller wheel 12. In this example, the axle 20 is inserted through a portion of the ride along board interface 820, the stroller wheel 12, and stroller frame 14, thereby attaching the ride along board at the wheel axle 20. Further, in this example, a cotter pin 22 is used to retain the axle. In other examples, a spring detent or snap can be used to retain the axle, as well as a quick release lever similar or identical as commonly used with bicycle wheels. FIG. 8B illustrates an exemplary ride along board system in which the interface 820 attaches the platform to the stroller at the rear wheel axle 20 when a pin 24 is inserted through two openings on the interface. Of course, other clamping or securing mechanisms are contemplated. Additionally, a locking feature (not shown) may be included to avoid unintended detachments during use.

Figure 9:
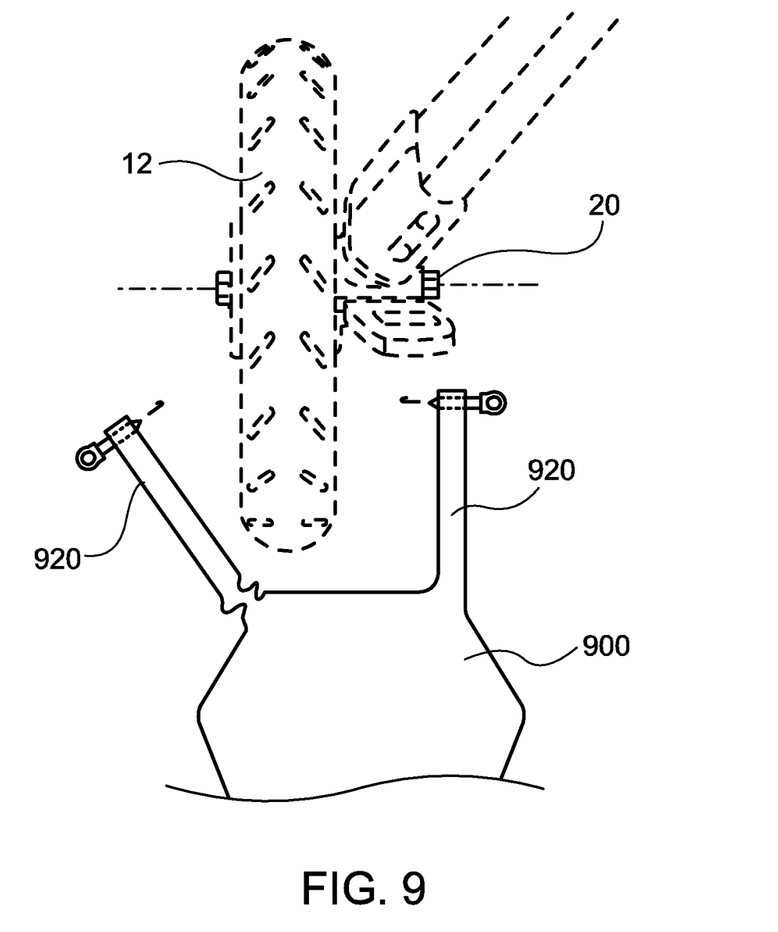
FIG. 9 illustrates an exemplary ride along board system in which the interface attaches to the left and right ends of the axle of a stroller wheel.

FIG. 9 illustrates another exemplary ride along board system 900 in which the interface 920 attaches to opposing ends of the axle 20 of a stroller wheel 12. In this example, the ride along board interface 920 includes holes for engaging opposing ends of the axle 20. For instance, the interface 920 can be attached to the axle 20 by placing the hole in the right portion of interface 920 over the extended axle with the left portion of interface 920 pivoted away from the wheel and axle 20, and then releasing the left portion to allow it to mate over the other side of the extended axle 20. As shown, in this example, the left portion of interface 920 comprises a flexible spring material to allow the interface 920 to move when engaging/disengaging the stroller wheel 20. Interface 920 may include any suitable material or feature to allow for such movement, however, it is noted that in some examples, the material or structure used for interfaces 920 may be sufficiently flexible to accommodate the axle without additional features added.

Figure 10:
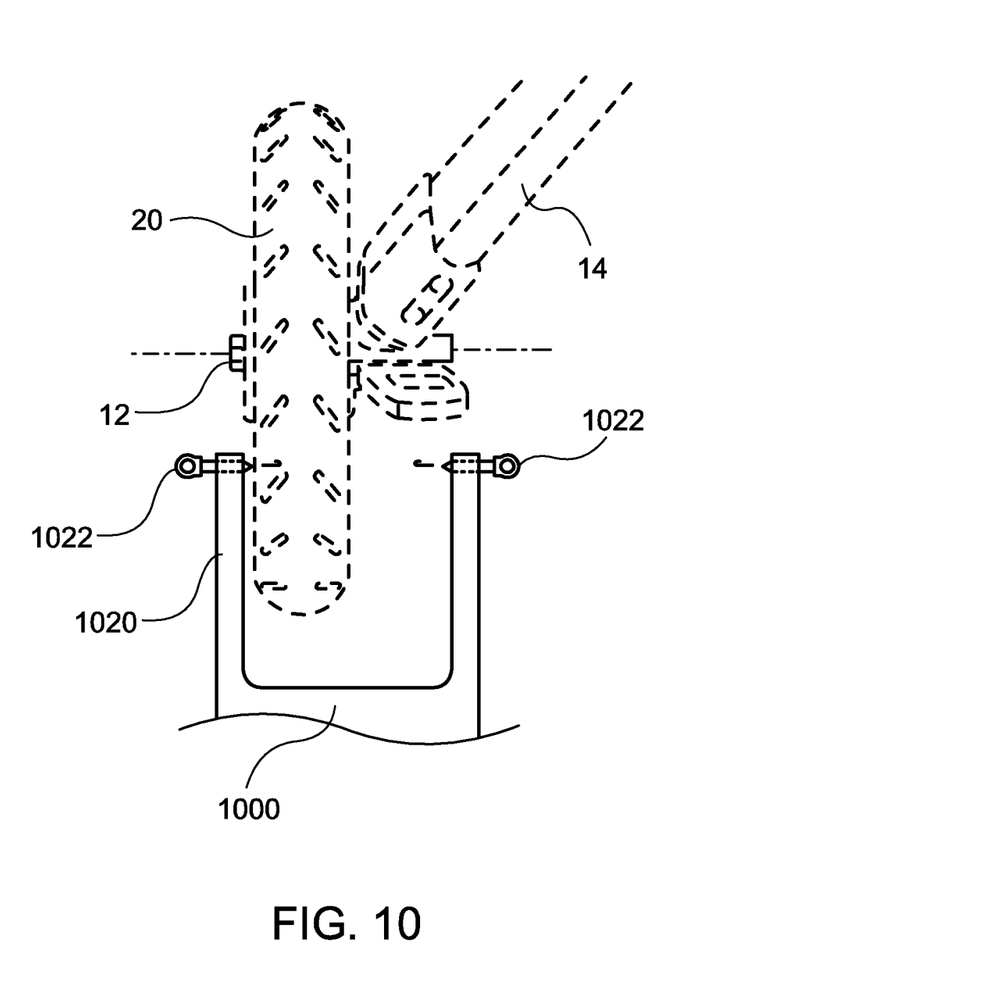
FIG. 10 illustrates an exemplary ride along board system in which the interface attaches to the left and right ends of the axle of a stroller wheel.

FIG. 10 illustrates yet another exemplary ride along board system 1000 in which the interfaces 1020 attaches to opposing ends of the axle 20 of a stroller wheel 12. In this example, a spring-loaded pin 1022 on each interface sits in a hole inside the axle 20 when engaged. The user may pull the pins 1022 out to detach the platform from the stroller. In other examples, the pins 1022 could be replaced with screws, allowing a user to rotate the pins into position to engage the ends of the axle. Additionally, a locking feature (not shown) may be included to avoid unintended detachments during use.

Figure 11:
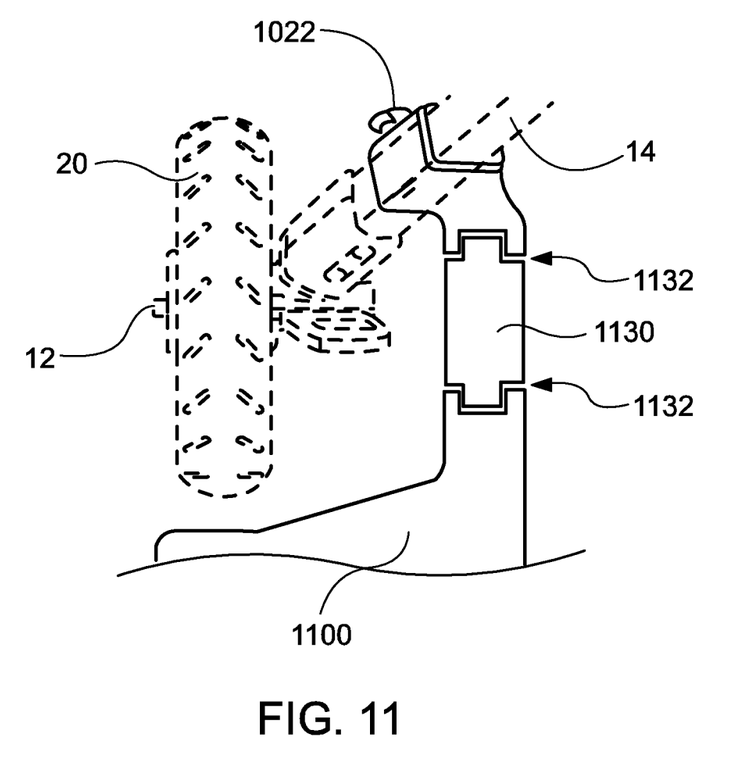
FIG. 11 illustrates an exemplary ride along board system in which the interface attaches to the stroller at one of the legs of the stroller.

FIG. 11 illustrates an exemplary ride along board system 1100 in which the interface 1120 attaches to the stroller frame 14, for example, to one of the legs of the stroller. In this example, the interface 1120 includes a rigid member 1130 that is connected by pivots 1132 to the platform 1100 on one end and a clamp attachment 1140 on the other. The clamp attachment 1140 is further attached to the rear stroller leg. It is again noted that various other attachment mechanisms are contemplated, such as pins, snaps, quick releases, and the like.

The foregoing descriptions of specific embodiments have been presented for purposes of illustration and description. They are not intended to be exhaustive, and it should be understood that many modifications and variations are possible in light of the above teaching.

We claim:

1. A stroller system, comprising:
a stroller comprising a frame, a wheel axle, and two rear wheels; and
a ride along board attached asymmetrically to the stroller on opposite sides of one of the stroller wheels, the ride along board comprising a platform and at least one wheel for supporting the platform;
wherein the ride along board is foldable about the wheel axle to a storage position; and
wherein the platform comprises a substantially planar surface structured for a child to stand on.

2. The stroller system of claim 1, wherein the ride along board is positioned in-line with one of the rear wheels.

3. The stroller system of claim 1, wherein the ride along board is positioned laterally outside of the width of a wheel base of the stroller.

4. The stroller system of claim 1, wherein the platform is positioned laterally outside of handlebars associated with the stroller.

5. The stroller system of claim 1, wherein the ride along board further includes at least three wheels defining a ride along board wheel base, and a center of mass of the ride along board is within the wheel base.

6. The stroller system of claim 1, wherein the ride along board is attached to opposing ends of an axle of one of the rear wheels.

7. The stroller system of claim 1, where the ride along board is attached to a portion of the frame.

8. The stroller system of claim 1, further comprising at least one handhold for a rider of the ride along board.

9. The stroller system of claim 1, further comprising a second ride along board, wherein the second ride along board is attached to a common wheel axle with the ride along board.

10. The stroller system of claim 1, further comprising a second ride along board, wherein the ride along board is attached to the wheel axle, and wherein the second ride along board is attached to a different wheel axle than the ride along board.

11. The stroller system of claim 1, wherein the ride along board is associated with a front wheel of the stroller.

12. The stroller system of claim 1, wherein the ride along board comprises two wheels for supporting the platform.

13. The stroller system of claim 1, wherein the ride along board is storable under a seating surface of the stroller when not in use.

14. The stroller system of claim 1, further comprising one of a cable, a latch, a button, or a strap for securing the ride along board in the storage position; wherein in the storage position the at least one wheel does not support the platform.

15. A ride along board system for attachment to a stroller, comprising:
a platform comprising a substantially planar surface structured for a rider to stand on;
at least one wheel mounted to the platform; and
an interface for engaging opposing ends of a wheel axle of a stroller;
wherein the platform is configured to attach asymmetrically to the stroller; and
wherein the ride along board is foldable about the wheel axle to a storage position.

16. The ride along board system of claim 15, wherein the interface includes holes for receiving opposing ends of the wheel axle.

17. The ride along board system of claim 15, wherein the interface includes opposing pins for engaging opposing ends of the wheel axle.

18. The ride along board system of claim 15, wherein the interface comprises a U-shaped member for attaching to the wheel axle.

19. The ride along board system of claim 15, further comprising at least three wheels defining a wheel base, and a center of mass of the ride along board is within the wheel base.

20. A ride along board system for attachment to a stroller, comprising:
- a platform comprising a substantially planar surface structured for a rider to stand on;
- at least three wheels defining a wheel base, wherein the center of mass of the platform is within the wheel base; and
- an interface for engaging a stroller, the stroller comprising a wheel axle;
- wherein the platform is configured to attach asymmetrically to the stroller; and
- wherein the platform is foldable about the wheel axle to a storage position.

21. The ride along board system of claim 20, wherein the interface includes holes for receiving opposing ends of the wheel axle of the stroller.

22. The ride along board system of claim 20, wherein the interface includes opposing pins for engaging opposing ends of the wheel axle of the stroller.

23. The ride along board system of claim 20, wherein the interface comprises a U-shaped member for attaching to the wheel axle of the stroller.

* * * * *